United States Patent [19]
Betremieux et al.

[11] Patent Number: 6,133,375
[45] Date of Patent: Oct. 17, 2000

[54] VULCANIZED RUBBERS MODIFIED BY THERMOPLASTICS

[75] Inventors: Isabelle Betremieux, Beaumontel; Patrick Alex, Limours Pecquese; Philippe Marcq; Christian Dousson, both of Bernay, all of France

[73] Assignee: Elf Atochem, S.A., Pateaux, France

[21] Appl. No.: 08/765,607

[22] PCT Filed: Apr. 23, 1996

[86] PCT No.: PCT/FR96/00618

§ 371 Date: Jun. 3, 1997

§ 102(e) Date: Jun. 3, 1997

[87] PCT Pub. No.: WO96/34048

PCT Pub. Date: Oct. 31, 1996

[30] Foreign Application Priority Data

Apr. 28, 1995 [FR] France ................... 95 05125
Dec. 21, 1995 [FR] France ................... 95 15244

[51] Int. Cl.[7] ............. C08L 77/00; C08L 19/00; C08L 9/02; C08L 71/03
[52] U.S. Cl. ............. 525/66; 525/179; 525/184; 525/408; 524/600; 524/606
[58] Field of Search ................... 524/600, 606; 525/184, 408, 179, 66

[56] References Cited

U.S. PATENT DOCUMENTS

| | | | |
|---|---|---|---|
| 4,297,453 | 10/1981 | Coran et al. | 525/408 |
| 4,661,563 | 4/1987 | Sasaki et al. | 525/179 |
| 4,866,127 | 9/1989 | Jacquemin et al. | 525/90 |
| 5,239,004 | 8/1993 | Pyke et al. | 525/184 |
| 5,330,837 | 7/1994 | Sullivan | 428/407 |
| 5,556,919 | 9/1996 | Oyama et al. | 525/189 |
| 5,683,819 | 11/1997 | Mori et al. | 526/341 |

FOREIGN PATENT DOCUMENTS

| | | |
|---|---|---|
| 0 040 060 A2 | 11/1981 | European Pat. Off. . |
| 0 251 791 B1 | 1/1992 | European Pat. Off. . |
| 0 364 859 B1 | 1/1994 | European Pat. Off. . |

*Primary Examiner*—P. Hampton-Hightower
*Attorney, Agent, or Firm*—Pennie & Edmonds LLP

[57] ABSTRACT

The present invention relates to a vulcanized mixture:
(i) of at least one functionalized rubber and
(ii) of at least one thermoplastic in an amount which is sufficient to increase the modulus at small elongations but such that the breaking stress is not reduced by more than 10%.

The thermoplastic can be chosen from polyamides and copolymers containing polyamide blocks and polyether blocks.

19 Claims, No Drawings

VULCANIZED RUBBERS MODIFIED BY THERMOPLASTICS

DESCRIPTION

The present invention relates to vulcanized rubbers modified by thermoplastics and more particularly to vulcanized mixtures (i) of functionalized rubbers and (ii) of thermoplastics. They can be prepared by incorporation of the thermoplastic in the molten state in the rubber and then vulcanization is carried out.

In the field of rubbers, it can be advantageous in certain applications (tires, conveyor belts, and the like) to be able to increase the stress at small elongations without encountering problems of heating the vulcanized components on use and on placing under dynamic loading or of aging which are generated by conventional solutions, such as reinforcement by carbon black or by a significant degree of crosslinking.

U.S. Pat. No. 5,239,004 explains that natural, SBR (styrene-butadiene), X-NBR (carboxylated nitrile-butadiene) or EPDM (ethylene-propylene-diene) rubbers can be modified by dithiodiacids and copolymers containing polyether blocks and polyamide blocks. This modification is an increase in the modulus at 50, 100 and 300% elongation. The examples only relate to natural rubber, which was mixed with 1% by weight of dithiodipropionic acid. 4% by weight, either of various copolymers containing polyether blocks and polyamide blocks or of polyamide-12, are then added to this rubber and vulcanization is then carried out.

An increase in the moduli at 50, 100 and 300% elongation is observed; in contrast, a fall of 20 to 35% in the breaking stress is recorded.

The compositions of the present invention also have markedly increased moduli at 50, 100 and 300% but they exhibit a better breaking stress.

The present invention describes the improvement in certain properties of the rubber (reinforcement, tear strength, and the like) without using dithiodiacid, while having a very fine and homogeneous dispersion of the thermoplastic in the rubber network.

EP 40060 describes thermoplastic mixtures of polyamide-6 and polyamide-66 or polyamide-6, polyamide-66 and polyamide-610 with epichlorohydrin rubbers. These are polyamide matrices containing epichlorohydrin rubber nodules. The examples compare the mixtures with vulcanized nodules and the mixtures with non-vulcanized nodules.

The products of the invention are not thermoplastic.

The present invention relates to the modification of rubbers by one or a number of thermoplastics. The thermoplastics are chosen so that they are compatible with the rubbers. This modification makes it possible to improve certain properties of the rubber while maintaining its elastomeric properties (Compression set, Elongation at break) and its resistance to oils:

Increase in the "green strength" or modulus at small elongations of the green rubber, that is to say before vulcanization.

Increase in the modulus at small elongations of the vulcanized rubber or reinforcing effect.

Increase in the tear strength and in the breaking stress.

Increase in the hardness.

Moreover, in certain cases, in particular in that of XNBR, the incorporation of thermoplastic of the copolymer containing polyamide blocks and polyether blocks type, in addition to all the improvements mentioned above, contributes to a marked improvement in the behaviour at low temperature, such as the elongation.

The present invention is thus a vulcanized mixture:
(i) of at least one functionalized rubber
(ii) and of at least one thermoplastic in an amount which is sufficient to increase the modulus at small elongations but such that the breaking stress is not reduced by more than 10%.

The functionalized rubber and the thermoplastic are mixed before vulcanization. The vulcanization agent and the possible catalysts are then introduced and then vulcanization is carried out. The agents and the catalysts can be introduced even during the mixing with the thermoplastic, provided that they are not active at the temperatures reached during mixing.

Mention may be made, as examples of functionalized rubbers, of acrylic rubbers, epichlorohydrin rubbers, rubbers on which reactive groups have been grafted, such as carboxylic acid, amine or epoxy functional groups, or chlorinated rubbers or rubbers which have been chlorinated.

Use may also be made of a mixture of one of the above rubbers with a non-functionalized rubber, such as styrene-butadiene (SBR), natural rubber or ethylene-propylene-diene (EPDM).

Mention may be made, among acrylic rubbers, of nitrile-butadiene (NBR) and hydrogenated nitrile-butadiene (HNBR). Epichlorohydrin rubbers are described in Kirk-Othmer, Encyclopedia of Chemical Technology, 3rd edition, Vol. 8, Elastomers chapter, pages 568 et seq.

These are polymers containing epichlorohydrin units which can also contain ethylene oxide, propylene oxide or substituted propylene oxide units. Mention may be made, among grafted rubbers, of carboxylated nitrile-butadienes (X-NBR). Mention may be made, among chlorinated rubbers, of chloroprene.

The amount of functional groups of the rubber is preferably between 0.3 and 10% by weight of the weight of the functionalized rubber or of the functionalized rubber/non-functionalized rubber combination.

The thermoplastic is defined as the product which increases the modulus of the functionalized rubber at small elongations, that is to say that the modulus of the vulcanized mixture of the invention is greater than the modulus of the vulcanized functionalized rubber (i). This increase can be by a factor of 10 for elongations up to 300%.

Simultaneously, the thermoplastic does not affect the breaking stress by more than 10%, that is to say that the breaking stress of the vulcanized mixture of the invention is not inferior by more than 10% with respect to the breaking stress of the vulcanized functionalized rubber (i). Most often, this stress is even improved.

Mention may be made, as examples of thermoplastic, of copolyetheresters. These are copolymers having polyether units derived from polyetherdiols, such as polyethylene glycol (PEG), polypropylene glycol (PPG) or polytetramethylene glycol (PTMG), dicarboxylic acid units, such as terephthalic acid, and glycol (ethanediol) or 1,4-butanediol units. The linking of the polyethers and the diacids forms flexible segments whereas the linking of glycol or of butanediol with the diacids forms rigid segments of the copolyetherester.

Such copolyetheresters are described in Patents EP 402,883 and EP 405,227, the contents of which are incorporated in the present application.

Mention may also be made, as thermoplastic, of polyetherurethanes, for example those comprising diisocyanate units, units derived from polyetherdiols and unit derived from ethanediol or from 1,4-butanediol.

Mention may also be made of polyesterurethanes, for example those comprising is duisocyanate units, units derived from amorphous polyesterdiols and units derived from ethanediol or from 1,4-butanediol.

The thermoplastic can also be a polyamide.

Polyamide is understood to mean the condensation products:

of one or a number of amino acids, such as aminocaproic, 7-aminoheptanoic, 11-aminoundecanoic and 12-aminododecanoic acids, from one or a number of lactams, such as caprolactam, oenantholactam and lauryllactam;

of one or a number of salts or mixtures of diamines, such as hexamethylenediamine, dodecamethylenediamine, meta-xylylenediamine, bis(p-aminocyclohexyl) methane and trimethylhexa-methylenediamine, with diacids, such as isophthalic, terephthalic, adipic, azelaic, suberic, sebacic and dodecanedicarboxylic acids;

or of the mixtures of some of these monomers which results in copolyamides.

Polyamide mixtures can be used. Use is advantageously made of PA-11, PA-12 and the copolyamide containing 6 units and 12 units (PA-6/12).

The thermoplastic can also be a mixture of polyamide and of polyolefins. The polyamide can be chosen from the above.

Polyolefins is understood to mean polymers comprising olefin units, such as, for example, ethylene, propylene or 1-butene units and the like.

Mention may be made, by way of example, of:

polyethylene, polypropylene or copolymers of ethylene with α-olefins, it being possible for these products to be grafted by unsaturated carboxylic acid anhydrides, such as maleic anhydride, or unsaturated epoxides, such as glycidyl methacrylate, copolymers of ethylene with at least one product chosen from (i) unsaturated carboxylic acids, their salts or their esters, (ii) vinyl esters of saturated carboxylic acids, (iii) unsaturated dicarboxylic acids, their salts, their esters, their half-esters or their anhydrides, or (iv) unsaturated epoxides, it being possible for these copolymers of ethylene to be grafted by unsaturated dicarboxylic acid anhydrides or unsaturated epoxides, styrene/ethylene-butene/styrene (SEBS) copolymers which are optionally maleized.

Mixtures of two or a number of these polyolefins may be used.

Use is advantageously made of:

polyethylene, copolymers of ethylene and of an α-olefin, copolymers of ethylene/of an alkyl (meth)acrylate, copolymers of ethylene/of an alkyl (meth)acrylate/of maleic anhydride, the maleic anhydride being grafted or copolymerized, copolymers of ethylene/of an alkyl (meth)acrylate/of glycidyl methacrylate, the glycidyl methacrylate being grafted or copolymerized, polypropylene.

It is recommended, to facilitate the formation of the polyamide matrix, and if the polyolefins have few or no functional groups which can facilitate the compatibilization, to add a compatibilizing agent.

The compatibilizing agent is a product known per se for compatibilizing polyamides and polyolefins.

Mention may be made, for example, of:

polyethylene, polypropylene, ethylene-propylene copolymers or ethylene-butene copolymers, all these products being grafted by maleic anhydride or glycidyl methacrylate, ethylene/alkyl (meth)acrylate/maleic anhydride copolymers, the maleic anhydride being grafted or copolymerized, ethylene/vinyl acetate/maleic anhydride copolymers, the maleic anhydride being grafted or copolymerized, the two above copolymers in which maleic anhydride is replaced by glycidyl methacrylate, ethylene/(meth)acrylic acid copolymers, optionally their salts, polyethylene, polypropylene or ethylene-propylene copolymers, these polymers being grafted by a product exhibiting a site which reacts with amines; these grafted copolymers then being condensed with polyamides or polyamide oligomers having a single amine end.

These products are described in Patents FR 2,291,225 and EP 342,066, the contents of which are incorporated in the present application.

The amount of polyamide forming the matrix can be between 55 and 95 parts per 5 to 45 parts of polyolefins.

The amount of compatibilizing agent is the amount sufficient for the polyolefin to disperse in the form of nodules in the polyamide matrix. It can represent up to 20% of the weight of the polyolefin. These polymers are manufactured by mixing polyamide, polyolefin and optionally compatibilizing agent according to the usual techniques for mixing in the molten state (twin-screw, Buss, single-screw).

The mixture advantageously comprises a polyamide-6 (PA-6) or polyamide-66 (PA-6,6) matrix in which either nodules of a mixture of low density polyethylene and of copolymer of ethylene, of alkyl (meth)acrylate and of maleic anhydride or of glycidyl methacrylate or nodules of polypropylene are dispersed.

Such products are described in U.S. Pat. No. 5,070,145 and EP 564,338.

In the case of polypropylene, a compatibilizing agent is added which is advantageously an ethylene/propylene copolymer, mostly propylene units by number, grafted by maleic anhydride and then subsequently condensed with monoamino caprolactam oligomers.

These polyamide and polyolefin mixtures can be plasticized and can optionally contain fillers, such as carbon black and the like.

Such polyamide and polyolefin mixtures are described in U.S. Pat. No. 5,342,886.

Mention may also be made, as examples of thermoplastic, of polymers containing polyamide blocks anrd polyether blocks.

The polymers containing polyamide blocks and polyether blocks result from the copolycondensation of polyamide sequences containing reactive ends with polyether sequences containing reactive ends, such as, inter alia:

1) Polyamide sequences containing diamine chain ends with polyoxyalkylene sequences containing dicarboxyl chain ends.

2) Polyamide sequences containing dicarboxyl chain ends with polyoxy-alkylene sequences containing diamine chain ends obtained by cyanoethylation and hydrogenation of α,ω-dihydroxylated aliphatic polyoxyalkylene sequences known as polyetherdiols.

3) Polyamide sequences containing dicarboxyl chain ends with polyetherdiols, the products obtained being, in this specific case, polyetheresteramides.

The polyamide sequences containing dicarboxyl chain ends originate, for example, from the condensation of α,ω-aminocarboxylic acids from lactams or of dicarboxylic acids and diamines in the presence of a chain-limiting dicarboxylic acid. The polyamide blocks advantageously comprise polyamide-12 or polyamide-6.

The number-average molar mass $\overline{Mn}$ of the polyamide sequences is between 300 and 15,000 and preferably between 600 and 5000. The mass $\overline{Mn}$ of the polyether sequences is between 100 and 6000 and preferably between 200 and 3000.

The polymers containing polyamide blocks and polyether blocks can also comprise units distributed randomly. These polymers can be prepared by the simultaneous reaction of the polyether and of the precursors of the polyamide blocks.

For example, the polyetherdiol, a lactam (or an α,ω-amino acid) and a chain-limiting diacid can be reacted in the presence of a small amount of water. A polymer is obtained which has essentially polyether blocks and polyamide blocks of highly variable length but also the various reactants which have reacted randomly, which are distributed statistically along the polymer chain.

These polymers containing polyamide blocks and polyether blocks, whether they originate from the copolycondensation of polyamide and polyether sequences prepared beforehand or from a one-step reaction, exhibit, for example, Shore D hardnesses which can be between 20 and 75 and advantageously between 30 and 70 and an intrinsic viscosity between 0.8 and 2.5, measured in meta-cresol at 250° C. for an initial concentration of 0.8 g/100 ml.

Whether the polyether blocks derive from polyethylene glycol, from polyoxypropylene glycol or from polyoxytetramethylene glycol, they are either used as is and copolycondensed with polyamide blocks containing carboxyl ends or they are aminated in order to be converted into polyetherdiamines and condensed with polyamide blocks containing carboxyl ends. They can also be mixed with polyamide precursors and a chain limiter in order to form polymers containing polyamide blocks and polyether blocks having units distributed statistically.

Polymers containing polyamide blocks and polyether blocks are described in U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920.

The polyether can be, for example, a polyethylene glycol (PEG), a polypropylene glycol (PPG) or a polytetramethylene glycol (PTMG). The latter is also known as polytetrahydrofuran (PTHF).

Whether the polyether blocks are in the chain of the polymer containing polyamide blocks and polybther blocks in the form of diols or of diamines, they are known for simplicity as PEG blocks or PPG blocks or alternatively PTMG blocks and polymers containing PA-6 blocks and PTMG blocks.

It would not be departing from the scope of the invention if the polyether blocks contained different units, such as units derived from ethylene glycol (—OC$_2$H$_4$—), from propylene glycol

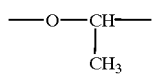

or alternatively from tetramethylene glycol (—O—(CH$_2$)$_4$—).

The polymer with polyamide blocks and polyether blocks preferably comprises a single type of polyamide block and a single type of polyether block. Use is advantageously made of polymers containing PA-12 blocks and PTMG blocks and copolymers containing PA-6 blocks and PTMG blocks.

Use may also be made of a mixture of these two polymers containing polyamide blocks and polyether blocks.

The polymer containing polyamide blocks and polyether blocks is advantageously such that the polyamide is the major constituent by weight, that is to say that the amount of polyamide which is in the form of blocks and that which is optionally distributed statistically in the chain represents 50% by weight or more of the polymer containing polyamide blocks and polyether blocks. The amount of polyamide and the amount of polyether are advantageously in the ratio (polyamide/polyether) 1/1 to 3/1.

This thermoplastic can also comprise plasticizers, antioxidants or agents for combating U.V. radiation.

The thermoplastic can also be a mixture of at least one polymer containing polyamide blocks and polyether blocks and of at least one polyolefin. This polyolefin and optionally a compatibilizing agent can be chosen from those mentioned above with regard to mixtures of polyamides and of polyolefins.

The thermoplastic can also be a mixture of polyamide and of polymer containing polyamide blocks and polyether blocks, it being possible for these products to be chosen from the products already mentioned above.

The thermoplastic can also be a polymer containing polyamide blocks and polyester blocks of amorphous nature. It can be prepared by condensation of polyamide blocks containing carboxylic acid ends with polyesterdiols.

The amount of thermoplastic can, for example, be up to 60 parts per 100 parts of non-formulated rubber, that is to say of 100 parts of XNBR or HNBR, for example.

Substantial effects are already observed for a few parts. The increase in the modulus varies with the increase in the amount of thermoplastic. This amount is usually between 5 and 50 parts, depending on the performance sought.

Within the meaning of the invention, small elongations are elongations of less than 350% and preferably of between 50 and 300%.

The breaking stress (of the vulcanized mixture of the invention) can fall by less than 10% for amounts of thermoplastic in the region of 5 per 100 parts of non-formulated rubber and then increase for increasing values of thermoplastic and exceed the breaking stress of the thermoplastic-free rubber. This fall, followed by a rise and an increase with respect to the thermoplastic-free rubber, is observed for thermoplastics such as polymers containing PA-12 blocks and PTMG blocks. For the other thermoplastics, in particular polymers containing PA-6 blocks and PTMG blocks, PA-11 and PA-12, there is always an increase in the breaking stress with respect to the rubber which does not contain thermoplastic.

The mixture of the invention is provided in the form of a tubber matrix and of thermoplastic nodules. These nodules advantageously have a size of less than 1 μm.

The tear strength is an increasing function of the amount of thermoplastic, whereas, if doping is carried out with carbon black instead of the thermoplastic, the tear strength increases with the amount of black, then passes through a maximum and always falls for increasing amounts of black.

The mixture of the invention also exhibits good dynamic properties, compared with doping with carbon black, and thus the percentage of hysteresis is reduced.

Thus, the slight internal heating of the mixture of the invention subjected to dynamic, in particular compressive, loadings is observed, whereas this is not true for carbon black.

The mixtures of the invention, subjected to dynamic loading tests according to NFT 46.045, exhibit a smaller tan δ than thermoplastic-free rubbers and than rubbers doped with carbon blacks.

Another advantage of the invention is the good resistance to oils, in particular the swelling in the oil is less than that of the rubber which does not contain thermoplastic as filler, including for the HNBR and XNBR rubbers.

This is all the more remarkable since these rubbers are regarded as being the most resistant to oils.

The modified rubber of the invention can be prepared in one or two stages, indeed the incorporation of the thermoplastic can be carried out before or during the formulation of the rubber.

The thermoplastic is incorporated at a temperature which is sufficient for it to be in the molten state. Mixing is then carried out until a dispersion in the rubber matrix is obtained.

The thermoplastic is advantageously chosen so that its melting temperature is similar to that of the non-formulated rubber or to the compounding temperature of the formulated rubber. It is also possible to proceed via an intermediate stage of rubber/thermoplastic non-vulcanized masterbatches, which are subsequently incorporated in the remainder of the rubber.

The mixing time is between 1 and 10 minutes and preferably between 5 and 8 minutes.

The blend obtained has a rubber matrix and can then be formulated on rollers, like a conventional rubber, with the advantage, with respect to the starting rubber, of greater ease of use as a result of the increase in the green strength or modulus at small elongations by the incorporation of thermoplastics.

Depending on the applications targeted, the rubber can advantageously be formulated with carbon black or light-colored fillers, with tackifying resins, additives of processing aid type, such as polyethylene glycol, stearic acid, zinc oxide, and the like.

These formulations can be vulcanized by sulphur-containing systems in the presence or absence of accelerators, by peroxides, with or without coagent, or alternatively by phenol/formaldehyde resins. The choice of the vulcanization system depends on the nature of the rubber and on the vulcanization kinetics desired at the temperatures of use.

If the vulcanization temperature is either substantially the same as that of mixing the rubber and the thermoplastic (before vulcanization) or greater, accelerators, such as peroxides, may be incorporated during this mixing or during the formulation of the rubber before incorporating the thermoplastic therein.

If the vulcanization temperature is substantially lower than that of mixing the rubber and the thermoplastic, it is then preferable to incorporate the accelerators after cooling the formulated rubber and thermoplastic mixture. This incorporation can be carried out over rollers and then the vulcanization is carried out.

Once vulcanized, a significant increase in the modulus at small elongations of the modified rubber is observed. This reinforcing effect of the thermoplastic can be advantageous in the field of tires, conveyor belts and the like, where high strength of the material is sought.

The vulcanization systems are known per se; use may be made, for example, of those described in Patent EP 550,346, the contents of which are incorporated by reference in the present application.

The present invention also relates to non-vulcanized thermoplastic and rubber masterbatches. These are the mixtures described above, except that the thermoplastic content is higher. These masterbatches are subsequently incorporated in the rubber and then vulcanized.

EXAMPLES

In the following examples, the ECO rubber is a GECO type terpolymer containing ethylene oxide, epichlorohydrin and allyl glycidyl ether units. It is hydrin T70X1 from Nippon Zeon.

The UNBR employed in carrying out the examples is Zetpol 2000 from Nippon Zeon.

The XNBR is Chemigum PX 7439, powder grade of NX775 from Goodyear, containing 10% of calcium carbonate.

The Pebax 1 (polyamide block ether 1) used is composed of 50% of polyamide-12 sequences (Mn=1000) and of 50% of polytetramethylene glycol sequences (Mn=1000) and is characterized by a melting point of 147° C. and an intrinsic viscosity of 1.60, measured at a concentration of 0.5 g/100 g in meta-cresol at 25° C.

The Pebax 2 (polyamide block ether 2) used is composed of 80% of polyamide-12 sequences (Mn=4000) and of 20% of polytetramethylene glycol sequences (Mn=1000) and is characterized by a melting point of 170° C. and an intrinsic viscosity of 1.40, measured at a concentration of 0.5 g/100 g in meta-cresol at 25° C.

The Pebax 3 (polyamide block ether 3) used is composed of 66% of polyamide-6 sequences (Mn=1300) and of 34% of polytetramethylene glycol sequences (Mn=650) and is characterized by a melting point of 195° C. and an intrinsic viscosity of 1.55, measured at a concentration of 0.5 g/100 g in meta-cresol at 25° C.

The Pebax 4 (polyamide block ether 4) used is composed of 80% of polyamide-6 sequences (Mn=2600) and of 20% of polytetramethylene glycol sequences (Mn=650) and is characterized by a melting point of 207° C. and an intrinsic viscosity of 1.52, measured at a concentration of 0.5 g/100 g in meta-cresol at 25° C.

Mechanical properties.

Example 1

90% of HNBR rubber and 10% of polyamide block ether 1 are mixed for 7 to 8 minutes at 165° C. in a Brabender mixer. The modified rubber is then formulated at 30° C. on a roll mill according to the following composition, by parts:

| | |
|---|---|
| Zetpol 2000 | 100 |
| Pebax 1 | 11.1 |
| Calcined kaolin | 30 |
| Silane A187 | 1 |
| PEG 4000 | 1 |
| Stearic acid | 0.55 |

-continued

| | |
|---|---|
| Zinc oxide | 3.33 |
| Perkadox 1440 | 6.7 |
| TiO$_2$ | 5 |

Example 2

The preparation is carried out in the same way a& in Example 1, 20% of Pebax 1 being incorporated in the HNBR during the first stage and the composition below being followed for the second formulation stage:

| | |
|---|---|
| Zetpol 2000 | 100 |
| Pebax 1 | 25 |
| Calcined kaolin | 30 |
| Silane A187 | 1 |
| PEG 4000 | 1 |
| Stearic acid | 0.65 |
| Zinc oxide | 3.75 |
| Perkadox 1440 | 7.5 |
| TiO$_2$ | 5 |

The mixtures of Examples 1 and 2, as well as a control not containing Pebax 1, were vulcanized under static conditions on a press at 180° C. under 90 bars for 12 minutes, in order to prepare slabs with a thickness of 2 mm. The mechanical properties were measured at 23° C. on test specimens produced from these slabs.

TABLE 1

Properties of the HNBR modified by Pebax 1

| Sample | Modulus 50% MPa | Modulus 100% MPa | Modulus 300% MPa | Breaking stress MPa | Tear strength N/mm | Elongation at break % |
|---|---|---|---|---|---|---|
| Control 1 without Pebax 1 | 1.0 | 1.3 | 3.7 | 12.4 | 28.7 | 742 |
| Example 1 | 1.3 | 1.8 | 4.9 | 13.1 | 31.8 | 726 |
| Example 2 | 1.8 | 2.4 | 5.5 | 14.8 | 38.4 | 733 |

Example 3

90% of XNBR rubber and 10% of polyamide block ether 1 are mixed for 7 to 8 minutes at 165° C. in a Brabender mixer. The modified rubber is then formulated at 30° C. on a roll mill according to the following composition, by parts:

| | |
|---|---|
| XNBR PX7439 | 110 |
| Pebax 1 | 11.1 |
| Calcined kaolin | 30 |
| Silane A187 | 1 |
| PEG 4000 | 1 |
| Stearic acid | 0.55 |
| Zinc oxide | 3.33 |
| Perkadox 1440 | 0.83 |
| TiO$_2$ | 5 |

Example 4

The preparation is carried out in the same way as in Example 3, 20% of Pebax 1 being incorporated in the XNBR during the first stage and the composition below being followed for the second formulation stage:

| | |
|---|---|
| XNBR PX7439 | 110 |
| Pebax 1 | 25 |
| Calcined kaolin | 30 |
| Silane A187 | 1 |
| PEG 4000 | 1 |
| Stearic acid | 0.65 |
| Zinc oxide | 3.75 |
| Perkadox 1440 | 0.94 |
| TiO$_2$ | 5 |

The mixtures of Examples 3 and 4, as well as a control not containing Pebax 1, were vulcanized under static conditions on a press at 180° C. under 90 bars for 12 minutes, in order to prepare slabs with a thickness of 2 mm. The mechanical properties were measured at 23° C. and −35° C. on test specimens produced from these slabs.

TABLE 2

Properties of the XNBR modified by Pebax 1

| Example | Modulus 50% MPa | Modulus 100% MPa | Modulus 300% MPa | Breaking stress MPa | Tear strength N/mm | Elongation at break at −35° C. % | Elongation at break at 23° C. % |
|---|---|---|---|---|---|---|---|
| Control 2 without Pebax 1 | 1.8 | 2.9 | 9.8 | 14.5 | 33.8 | 25 | 492 |
| Example 3 | 2.1 | 3.4 | 10.3 | 13.8 | 34.2 | 34 | 428 |
| Example 4 | 2.8 | 4.2 | 10.6 | 15.7 | 38.3 | 64 | 498 |

Example 5

The formulation of this example was prepared directly on a roll mill according to the following composition, by parts, which corresponds to a content of 95% of ENBR per 5% of Pebax 2:

| | |
|---|---|
| Zetpol 2000 | 100 |
| Pebax 2 | 5.5 |
| Calcined kaolin | 30 |
| Silane A187 | 1 |
| PEG 4000 | 1 |
| Naugard 445 | 2 |
| Stearic acid | 0.5 |
| Zinc oxide | 3 |
| Perkadox 1440 | 6 |
| TiO$_2$ | 5 |

Example 6

The preparation is carried out in the same way as in Example 5, the composition below (90% HNBR/10% Pebax 2) being followed:

| | |
|---|---|
| Zetpol 2000 | 100 |
| Pebax 2 | 11.1 |
| Calcined kaolin | 30 |
| Silane A187 | 1 |
| PEG 4000 | 1 |
| Naugard 445 | 2 |
| Stearic acid | 0.55 |
| Zinc oxide | 3.3 |
| Perkadox 1440 | 6.7 |
| TiO$_2$ | 5 |

Example 7

The preparation is carried out in the same way as in Example 5, the composition below (80% HNBR/20% Pebax 2) being followed:

| | |
|---|---|
| Zetpol 2000 | 100 |
| Pebax 2 | 25 |
| Calcined kaolin | 30 |
| Silane A187 | 1 |
| PEG 4000 | 1 |
| Naugard 445 | 2 |
| Stearic acid | 0.65 |
| Zinc oxide | 3.75 |
| Perkadox 1440 | 7.5 |
| TiO$_2$ | 5 |

The increase in the green strength and the processing aid appearance were demonstrated, with respect to the formulations of Examples 5, 6 and 7, by modulus measurements at small elongations before vulcanization.

TABLE 3

Green properties of the HNBR modified by Pebax 2

| Example | Modulus 50% MPa | Modulus 100% MPa | Modulus 300% MPa |
|---|---|---|---|
| Control 3 without Pebax 2 | 0.82 | 0.85 | 1.06 |
| Example 5 | 0.89 | 0.87 | 0.90 |
| Example 6 | 1.13 | 1.21 | 1.58 |
| Example 7 | 2.43 | 2.84 | 3.03 |

The mixtures of Examples 5, 6 and 7, as well as a control not containing Pebax 2, were then vulcanized under static conditions on a press at 180° C. under 90 bars for 12 minutes, in order to prepare slabs with a thickness of 2 mm. The mechanical properties were measured at 23° C. on test specimens produced from these slabs.

TABLE 4

Properties of the HNBR modified by Pebax 2

| Sample | Modulus 50% MPa | Modulus 100% MPa | Modulus 300% MPa | Breaking stress MPa | Elongation at break % | Shore A hardness | CS 22 h, 100° C. |
|---|---|---|---|---|---|---|---|
| Control 3 without Pebax 2 | 1.06 | 1.32 | 3.63 | 12.92 | 641 | 56 | 32 |
| Example 5 | 1.21 | 1.64 | 5.85 | 12.55 | 592 | 60 | 31.5 |
| Example 6 | 1.47 | 2.09 | 7.16 | 14.23 | 541 | 65 | 30.5 |
| Example 7 | 2.35 | 3.41 | 9.53 | 13.90 | 442 | 75 | 32 |

Example 8

The formulation of this example was prepared directly on a roll mill according to the following composition, by parts, which corresponds to 95% of XNBR per 5% of Pebax 2:

| | |
|---|---|
| XNBR PX7439 | 110 |
| Pebax 2 | 5.5 |

-continued

| | |
|---|---|
| Calcined kaolin | 20 |
| Silane A187 | 1 |
| PEG 4000 | 1 |

The mixtures of Examples 8, 9 and 10, as well as a control not containing Pebax 2, were vulcanized under static conditions on a press at 180° C. under 90 bars for 12 minutes, in order to prepare slabs with a thickness of 2 mm. The mechanical properties were measured at 23° C. on test specimens produced from these slabs.

TABLE 5

Properties of the XNBR modified by Pebax 2

| Sample | Modulus 50% MPa | Modulus 100% MPa | Modulus 300% MPa | Breaking stress MPa | Elongation at break % | Shore A hardness | CS 22 h, 100° C. |
|---|---|---|---|---|---|---|---|
| Control 4 without Pebax 2 | 1.08 | 1.51 | 4.36 | 11.51 | 611 | 65 | 27.5 |
| Example 8 | 1.33 | 1.99 | 6.00 | 12.74 | 566 | 68 | 30 |
| Example 9 | 1.77 | 2.84 | 8.30 | 15.05 | 534 | 70 | 34 |
| Example 10 | 2.85 | 4.63 | 10.87 | 17.58 | 492 | 75 | 36 |

-continued

| | |
|---|---|
| Naugard 445 | 2 |
| Stearic acid | 0.5 |
| Zinc oxide | 3 |
| Perkadox 1440 | 0.8 |
| $TiO_2$ | 5 |

Example 9

The preparation is carried out in the same way as in Example 8, the composition below (90% XNBR/10% Pebax 2) being followed:

| | |
|---|---|
| XNBR PX7439 | 110 |
| Pebax 2 | 11.1 |
| Calcined kaolin | 20 |
| Silane A187 | 1 |
| PEG 4000 | 1 |
| Naugard 445 | 2 |
| Stearic acid | 0.55 |
| Zinc oxide | 3.3 |
| Perkadox 1440 | 0.83 |
| $TiO_2$ | 5 |

Example 10

The preparation is carried out in the same way as in Example 8, the composition below (80% XBNR/20% Pebax 2) being followed:

| | |
|---|---|
| XNBR PX7439 | 110 |
| Pebax 2 | 25 |
| Calcined kaolin | 20 |
| Silane A187 | 1 |
| PEG 4000 | 1 |
| Naugard 445 | 2 |
| Stearic acid | 0.65 |
| Zinc oxide | 3.75 |
| Perkadox 1440 | 0.94 |
| $TiO_2$ | 5 |

Example 11

The formulation of this example was prepared directly on a roll mill according to the following composition, by parts, which corresponds to 95% of ECOT per 5% of Pebax 2:

| | |
|---|---|
| Hydrin T70X1 | 100 |
| Pebax 2 | 5.5 |
| Calcined kaolin | 30 |
| Silane A187 | 1 |
| PEG 4000 | 1 |
| Naugard 445 | 2 |
| Stearic acid | 1 |
| Maglite D | 3 |
| Zisnet F | 1.2 |
| $CaCO_3$ | 5 |
| $TiO_2$ | 5 |

Example 12

The preparation is carried out in the same way as in Example 11, the composition below (90% ECOT/10% Pebax 2) being followed:

| | |
|---|---|
| Hydrin T70X1 | 100 |
| Pebax 2 | 11.1 |
| Calcined kaolin | 30 |
| Silane A187 | 1 |
| PEG 4000 | 1 |
| Naugard 445 | 2 |
| Stearic acid | 1 |
| Maglite D | 3 |
| Zisnet F | 1.5 |
| $CaCO_3$ | 5 |
| $TiO_2$ | 5 |

Example 13

The preparation is carried out in the same way as in Example 11, the composition below (80% ECOT/20% Pebax 2) being followed:

| | |
|---|---|
| Hydrin T70X1 | 100 |
| Pebax 2 | 25 |
| Calcined kaolin | 30 |
| Silane A187 | 1 |
| PEG 4000 | 1 |
| Naugard 445 | 2 |
| Stearic acid | 1 |
| Maglite D | 3 |
| Zisnet F | 1.7 |
| CaCO$_3$ | 5 |
| TiO$_2$ | 5 |

The mixtures of Examples 11, 12 and 13, as well as a control not containing Pebax 2, were vulcanized under static conditions on a press at 180° C. under 90 bars for 12 minutes, in order to prepare slabs with a thickness of 2 mm. The mechanical properties were measured at 23° C. on test specimens produced from these slabs.

TABLE 6

Properties of the ECOT modified by Pebax 2

| Sample | Modulus 50% MPa | Modulus 100% MPa | Modulus 300% MPa | Breaking stress MPa | Elongation at break % | Shore A hardness | CS % 22 h, 100° C. |
|---|---|---|---|---|---|---|---|
| Control 5 without Pebax 2 | 0.89 | 1.50 | 4.97 | 5.74 | 337 | 49 | 8 |
| Example 11 | 1.24 | 2.29 | — | 5.54 | 225 | 57 | 13 |
| Example 12 | 2.00 | 3.80 | — | 6.59 | 183 | 65 | 23 |
| Example 13 | 3.05 | 5.27 | — | 7.62 | 166 | 77 | 32.5 |

Example 14

The XNBR is formulated on rollers according to the following composition, by parts:

| | |
|---|---|
| XNBR PX7439 | 110 |
| CaCO$_3$ | 30 |
| PEG 4000 | 3 |
| Naugard 445 | 2 |
| Stearic acid | 0.5 |
| Zinc oxide | 3 |

88.7% of formulated XNBR and 10% of Pebax 3 are mixed for 7 to 8 minutes at 200° C. in a Brabender mixer. Cooling is allowed to take place and 1.3% of Peroxymon F40 are added on rollers.

Example 15

78.9% of XNBR, formulated according to Example 14, and 20% of Pebax 3 are mixed for 7 to 8 minutes at 200° C. in a Brabender mixer. Cooling is allowed to take place and 1.1% of Peroxymon F40 are added on rollers.

Example 16

69% of XNBR, formulated according to Example 14, and 30% of Pebax 3 are mixed for 7 to 8 minutes at 200° C. in a Brabender mixer. Cooling is allowed to take place and 1% of Peroxymon F40 is added on rollers.

The mixtures of Examples 14, 15 and 16, as well as a control not containing Pebax 3, were vulcanized under static conditions on a press at 180° C. under 90 bars for 12 minutes, in order to prepare slabs with a thickness of 2 mm. The mechanical properties were measured at 23° C. on test specimens produced from these slabs.

TABLE 7

Properties of the XNBR modified by Pebax 3

| Sample | Modulus 50% Mpa | Modulus 100% Mpa | Modulus 300% Mpa | Breaking stress Mpa | Elongation at break % | Tear strength N/mm | Shore A hardness | CS % 22 h, 100° C. |
|---|---|---|---|---|---|---|---|---|
| Control 6 without Pebax 3 | 1.04 | 1.46 | 3.14 | 12.10 | 500 | 21.6 | 53 | 10 |
| Example 14 | 1.75 | 2.63 | 6.81 | 14.60 | 450 | 30.2 | 60 | 18 |
| Example 15 | 2.58 | 4.36 | 7.82 | 19.90 | 430 | 42.4 | 66 | 26 |
| Example 16 | 4.03 | 6.66 | 17.10 | 22.10 | 390 | 53.8 | 74 | 34 |

Example 17

89.7% of XNBR, formulated according to Example 14, and 10% of Pebax 4 are mixed for 7 to 8 minutes at 200° C. in a Brabender mixer. Cooling is allowed to take place and 1.3% of Peroxymon F40 are added on rollers.

Example 18

78.9% of XNBR, formulated according to Example 14, and 20% of Pebax 4 are mixed for 7 to 8 minutes at 200° C. in a Brabender mixer. Cooling is allowed to take place and 1.1% of Peroxymon F40 are added on rollers.

Example 19

69% of XNBR, formulated according to Example 14, and 30% of Pebax 4 are mixed for 7 to 8 minutes at 200° C. in a Brabender mixer. Cooling is allowed to take place and 1% of Peroxymon F40 is added on rollers.

The mixtures of Examples 17, 18 and 19, as well as a control not containing Pebax 4, were vulcanized under static conditions on a press at 180° C. under 90 bars for 12 minutes, in order to prepare slabs with a thickness of 2 mm. The mechanical properties were measured at 23° C. on test specimens produced from these slabs.

Example 21

78.9% of XNBR, formulated according to Example 14, and 20% of PA-11 are mixed for 7 to 8 minutes at 190° C. in a Brabender mixer. Cooling is allowed to take place and 1.1% of Peroxymon F40 are added on rollers.

Example 22

69% of XNBR, formulated according to Example 14, and 30% of PA-11 are mixed for 7 to 8 minutes at 190° C. in a Brabender mixer. Cooling is allowed to take place and 1% of Peroxymon F40 is added on rollers.

The mixtures of Examples 20, 21 and 22, as well as a control not containing PA-11, were vulcanized under static

TABLE 8

| | Properties of the XNBR modified by Pebax 4 | | | | | | | |
|---|---|---|---|---|---|---|---|---|
| Sample | Modulus 50% MPa | Modulus 100% MPa | Modulus 300% MPa | Breaking stress MPa | Elongation at break % | Tear strength N/mm | Shore A Hardness | CS % 22 h, 100° C. |
| Control 6 without Pebax 4 | 1.04 | 1.46 | 3.14 | 12.10 | 500 | 21.6 | 53 | 10 |
| Example 17 | 1.98 | 3.50 | 11.9 | 17.80 | 380 | 30.9 | 61 | 13 |
| Example 18 | 3.59 | 6.87 | 19.30 | 21.50 | 330 | 42.5 | 70 | 17 |
| Example 19 | 6.76 | 13.02 | 22.40 | 27.00 | 260 | 54.8 | 80 | 20 |

Example 20

89.7% of XNBR, formulated according to Example 14, and 10% of PA-11 are mixed for 7 to 8 minutes at 190° C. in a Brabender mixer. Cooling is allowed to take place and 1.3% of Peroxymon F40 are added on rollers.

conditions on a press at 180° C. under 90 bars for 12 minutes, in order to prepare slabs with a thickness of 2 mm. The mechanical properties were measured at 23° C. on test specimens produced from these slabs.

TABLE 9

| | Properties of the XNBR modified by PA-11 | | | | | | | |
|---|---|---|---|---|---|---|---|---|
| Sample | Modulus 50% MPa | Modulus 100% MPa | Modulus 300% MPa | Breaking stress MPa | Elongation at break % | Tear strength N/mm | Shore A hardness | CS % 22 h, 100° C. |
| Control 6 without PA-11 | 1.04 | 1.46 | 3.14 | 12.10 | 500 | 221.6 | 53 | 10 |
| Example 20 | 2.08 | 3.39 | 10.1 | 17.1 | 410 | 35.0 | 63 | 14 |
| Example 21 | 4.57 | 7.74 | 18.90 | 21.60 | 340 | 47.0 | 77 | 18 |
| Example 22 | 13.33 | 22.2 | — | 27.60 | 150 | 54.8 | 88 | 24 |

Example 23

89.7% of XNBR, formulated according to Example 14, and 10% of PA-12 are mixed for 7 to 8 minutes at 190° C. in a Brabender mixer. Cooling is allowed to take place and 1.3% of Peroxymon F40 are added on rollers.

Example 24

78.9% of XNBR, formulated according to Example 14, and 20% of PA-12 are mixed for 7 to 8 minutes at 190° C. in a Brabender mixer. Cooling is allowed to take place and 1.1% of Peroxymon F40 are added on rollers.

Example 25

69% of XNBR, formulated according to Example 14, and 30% of PA-12 are mixed for 7 to 8 minutes at 190° C. in a Brabender mixer. Cooling is allowed to take place and 1% of Peroxymon F40 is added on rollers.

The mixtures of Examples 23, 24 and 25, as well as a control not containing PA-12, were vulcanized under static conditions on a press at 180° C. under 90 bars for 12 minutes, in order to prepare slabs with a thickness of 2 mm. The mechanical properties were measured at 23° C. on test specimens produced from these slabs.

The mixtures of Examples 26, 27 and 28, as well as a control not containing black, were vulcanized under static conditions on a press at 180° C. under 90 bars for 12 minutes, in order to prepare slabs with a thickness of 2 mm. The mechanical properties were measured at 23° C. on test specimens produced from these slabs.

TABLE 11

Properties of the XNBR reinforced by FEF N550 black

| Example | Modulus 50% MPa | Modulus 100% MPa | Modulus 300% MPa | Tear strength N/mm | Shore A hardness |
|---|---|---|---|---|---|
| Control 6 without black | 1.04 | 1.46 | 3.14 | 21.6 | 53 |
| Example 26 | 1.71 | 2.58 | 7.61 | 29.1 | 62 |
| Example 27 | 2.14 | 3.42 | 11.70 | 33.0 | 67 |
| Example 28 | 3.00 | 5.14 | 18.19 | 28.1 | 72 |

Dynamic Properties

In this part, an attempt has been made to compare the dynamic properties of the XNBR mixtures reinforced by Pebax 3, prepared in Examples 14, 15 and 16, with the

TABLE 10

Properties of the XNBR modified by PA-12

| Sample | Modulus 50% MPa | Modulus 100% MPa | Modulus 300% MPa | Breaking stress MPa | Elongation at break % | Tear strength N/mm | Shore A hardness | CS % 22 h, 100° C. |
|---|---|---|---|---|---|---|---|---|
| Control 6 without PA-12 | 1.04 | 1.46 | 3.14 | 12.10 | 500 | 21.6 | 53 | 10 |
| Example 23 | 1.92 | 3.08 | 8.30 | 16.70 | 430 | 31.4 | 62 | 15 |
| Example 24 | 4.17 | 6.49 | 13.60 | 20.10 | 400 | 41.8 | 75 | 21 |
| Example 25 | 8.41 | 11.95 | — | 22.10 | 300 | 52.4 | 86 | 27 |

The following examples were carried out for the purposes of comparison. In fact, different levels of carbon black FEF N550 were added to the XNBR formulation of Example 14, in order to compare the reinforcing effect of the thermoplastics with that of a black.

Example 26

The XNBR is formulated on rollers according to the following composition, by parts:

| XNBR PX7439 | 110 |
|---|---|
| CaCO₃ | 30 |
| N550 | 10 |
| PEG 4000 | 3 |
| Naugard 445 | 2 |
| Stearic acid | 0.5 |
| Zinc oxide | 3 |
| Peroxymon F40 | 2 |

Example 27

The same formulation is prepared as in Example 26, 20 parts of FEF N550 black being introduced instead of 10.

Example 28

The same formulation is prepared as in Example 26, 30 parts of FEF N550 black being introduced instead of 10.

dynamic properties of the XNBR mixtures reinforced by different levels of black and prepared in Examples 26, 27 and 28.

In fact, for these examples, the levels of reinforcements (see Tables 7 and 11) and the hardnesses are equivalent for the mixtures containing thermoplastics as filler and those containing black as filler.

In a first test, the hysteresis areas developed were compared between mixtures containing black as filler and rubbers modified by Pebax 3 during a tensile experiment ranging up to 90% of deformation of the test specimens (130 mm×2 mm).

TABLE 12

Comparative hysteresis values between mixtures containing black as filler and rubbers modified by thermoplastics

| Mixtures containing black | | Mixtures with Pebax 3 | |
|---|---|---|---|
| Sample | % Hysteresis[1] | Sample | % Hysteresis[1] |
| Example 26 | 35 | Example 14 | 26 |
| Example 27 | 38 | Example 15 | 28 |
| Example 28 | 42 | Example 16 | 29 |

[1]in all the cases, the hysteresis value was measured after 5 deformation cycles.

A second comparative test between these same mixtures was carried out according to NFT standard 46.045. Cylindrical segments (d=17.8 mm, h=25 mm) were subjected to a compressive dynamic loading (compression of 250N, deformation with an amplitude of 1 mm, frequency scanning from 0 to 50 Hz). The change in tan δ, called loss factor, was observed as a function of the frequency and a large decrease in tan δ for the mixtures modified by thermoplastics is observed, which is characteristic of weaker internal heating.

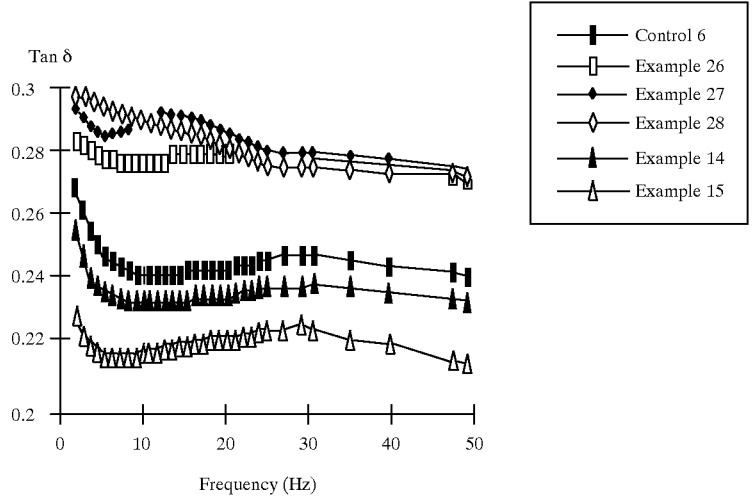

Resistance to Oils

The resistance to oils is measured according to the principle of ASTM standard D471, by immersing the mixtures of Examples 5, 6, 7, 8, 9, 10, 11, 12 and 13, as well as their control, in ASTM oil 3 for 7 days at 100° C. and by measuring their % of swelling.

TABLE 13

Resistance to oils of the modified rubbers.

| Reference | Composition | % of swelling |
| --- | --- | --- |
| Control 3 | 100% HNBR | 21 |
| Example 5 | 95% HNBR/5% Pebax 2 | 20 |
| Example 6 | 90% HNBR/10% Pebax 2 | 19 |
| Example 7 | 80% HNBR/20% Pebax 2 | 17 |
| Control 4 | 100% XNBR | 18 |
| Example 8 | 95% XNBR/5% Pebax 2 | 17.5 |
| Example 9 | 90% XNBR/10% Pebax 2 | 16 |
| Example 10 | 80% XNBR/20% Pebax 2 | 15 |
| Control 5 | 100% ECOT | 11 |
| Example 11 | 95% ECOT/5% Pebax 2 | 10.5 |
| Example 12 | 90% ECOT/10% Pebax 2 | 10 |
| Example 13 | 80% ECOT/20% Pebax 2 | 9 |

What is claimed is:

1. A vulcanized mixture comprising:
   (i) at least one functionalized rubber selected from the group consisting of epichlorohydrin rubbers and chlorinated rubbers, and
   (ii) at least one thermoplastic, wherein the thermoplastic is present in an amount sufficient to increase the modulus of the vulcanized mixture at an elongation of up to about 300%, and wherein the amount of the thermoplastic present reduces the breaking stress of the vulcanized mixture by less than about 10%.

2. The mixture of claim 1, wherein the at least one functionalized rubber is epichlorohydrin rubber, chloroprene, or mixtures thereof.

3. The mixture of claim 1, wherein the thermoplastic is a polymer comprising polyamide blocks and polyether blocks.

4. The mixture of claim 2, wherein the thermoplastic is a polymer comprising polyamide blocks and polyether blocks.

5. The vulcanized mixture of claim 1, wherein the thermoplastic is present in an amount up to about 60 parts by weight per 100 parts of functionalized rubber based on the amount of the functionalized rubber.

6. The vulcanized mixture of claim 5, wherein the thermoplastic is present in an amount from about 5 parts to about 50 parts by weight per 100 parts of functionalized rubber.

7. The vulcanized mixture of claim 2, wherein the thermoplastic is present in an amount up to about 60 parts by weight per 100 parts of functionalized rubber based on the amount of the functionalized rubber.

8. The vulcanized mixture of claim 7, wherein the thermoplastic is present in an amount from about 5 parts to about 50 parts by weight per 100 parts of functionalized rubber.

9. The vulcanized mixture of claim 3, wherein the thermoplastic is present in an amount up to about 60 parts by weight per 100 parts of functionalized rubber based on the amount of the functionalized rubber.

10. The vulcanized mixture of claim 9, wherein the thermoplastic is present in an amount from about 5 parts to about 50 parts by weight per 100 parts of functionalized rubber.

11. The vulcanized mixture of claim 4, wherein the thermoplastic is present in an amount up to about 60 parts by weight per 100 parts of functionalized rubber based on the amount of the functionalized rubber.

12. The vulcanized mixture of claim 11, wherein the thermoplastic is present in an amount from about 5 parts to about 50 parts by weight per 100 parts of functionalized rubber.

13. A process for manufacturing a vulcanized mixture comprising at least one functionalized rubber and at least one thermoplastic, wherein the thermoplastic is present in an amount sufficient to increase the modulus of the vulcanized mixture at an elongation of up to about 300% and wherein the amount of the thermoplastic present reduces the breaking stress of the vulcanized mixture by less than about 10%, the process comprising forming a matrix comprising a functionalized rubber, melting at least one thermoplastic, incorporating the thermoplastic into the functionalized rubber matrix, forming a dispersion of the thermoplastic in the functionalized rubber matrix and vulcanizing the mixture.

14. A vulcanized mixture comprising:
 (i) at least one functionalized rubber, and
 (ii) at least one thermoplastic selected from the group consisting of copolyetheresters, polyetherurethanes, polyesterurethanes, polyamides, polyamide/polyolefin mixtures, and polymers consisting essentially of polyamide blocks and polyester blocks, wherein the thermoplastic is present in an amount sufficient to increase the modulus of the vulcanized mixture at an elongation of up to about 300%, and wherein the amount of the thermoplastic present reduces the breaking stress of the vulcanized mixture by less than about 10%.

15. The vulcanized mixture of claim 14, wherein the at least one functionalized rubber is hydrogenated nitrile-butadiene rubber, carboxylated nitrile-butadiene rubber, epichlorohydrin rubber, or mixtures thereof.

16. The vulcanized mixture of claim 14, wherein the thermoplastic is present in an amount up to about 60 parts by weight per 100 parts of functionalized rubber based on the amount of the functionalized rubber.

17. The vulcanized mixture of claim 16, wherein the thermoplastic is present in an amount from about 5 parts to about 50 parts by weight per 100 parts of functionalized rubber.

18. The vulcanized mixture of claim 15, wherein the thermoplastic is present in an amount up to about 60 parts by weight per 100 parts of functionalized rubber based on the amount of the functionalized rubber.

19. The vulcanized mixture of claim 18, wherein the thermoplastic is present in an amount from about 5 parts to about 50 parts by weight per 100 parts of functionalized rubber.

* * * * *